(12) United States Patent
Tsujii

(10) Patent No.: US 7,866,568 B2
(45) Date of Patent: Jan. 11, 2011

(54) DATA RECORDING APPARATUS AND METHOD FOR CONTROLLING THE SAME, AND DATA RECORDING MEDIUM AND METHOD FOR CONTROLLING THE SAME

(75) Inventor: Hideaki Tsujii, Chigasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/479,749

(22) Filed: Jun. 5, 2009

(65) Prior Publication Data

US 2009/0302110 A1 Dec. 10, 2009

(30) Foreign Application Priority Data

Jun. 9, 2008 (JP) .............................. 2008-150811

(51) Int. Cl.
| | |
|---|---|
| *G06F 17/00* | (2006.01) |
| *G07F 19/00* | (2006.01) |
| *G06K 5/00* | (2006.01) |
| *G06K 7/00* | (2006.01) |
| *G06K 19/00* | (2006.01) |
| *G07B 15/00* | (2006.01) |

(52) U.S. Cl. .................. 235/492; 235/375; 235/379; 235/380; 235/384; 235/440; 235/441; 235/487

(58) Field of Classification Search ................. 235/492, 235/487, 375, 379–380, 384, 440–441
See application file for complete search history.

(56) References Cited

U.S. PATENT DOCUMENTS

| | | | | |
|---|---|---|---|---|
| 5,929,414 | A * | 7/1999 | Saitoh ........................ | 235/380 |
| 6,375,082 | B1 * | 4/2002 | Kobayashi et al. .......... | 235/492 |
| 6,899,277 | B2 | 5/2005 | Kawano et al. | |
| 2006/0163364 | A1 * | 7/2006 | Sakamura et al. ........... | 235/492 |

FOREIGN PATENT DOCUMENTS

JP 2003-36428 A 2/2003

\* cited by examiner

*Primary Examiner*—Michael G Lee
*Assistant Examiner*—Laura Gudorf
(74) *Attorney, Agent, or Firm*—Rossi, Kimms & McDowell LLP

(57) ABSTRACT

A data recording apparatus can be attached thereto with a recording medium having a first communication part and a second communication part. The data recording apparatus comprises a third communication part adapted to communicate with the first communication part, and a fourth communication part adapted to communicate with the second communication part. The data recording apparatus takes control to stop communication of the fourth communication part with the second communication part if the third communication part can communicate with the first communication part in a case where the detection part detects the data recording medium being attached to the data recording apparatus.

4 Claims, 7 Drawing Sheets

FIG.3
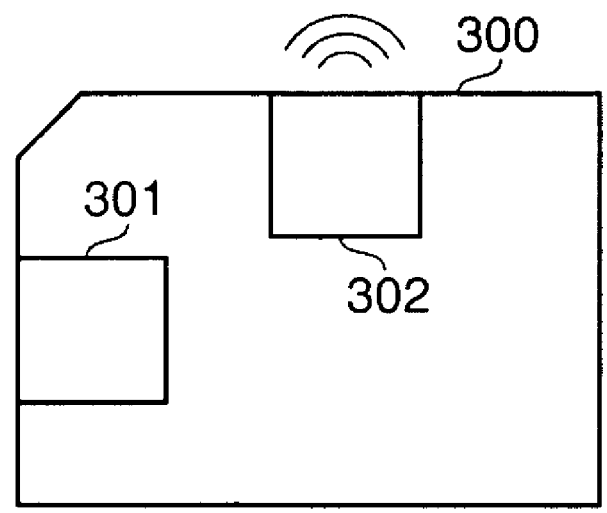
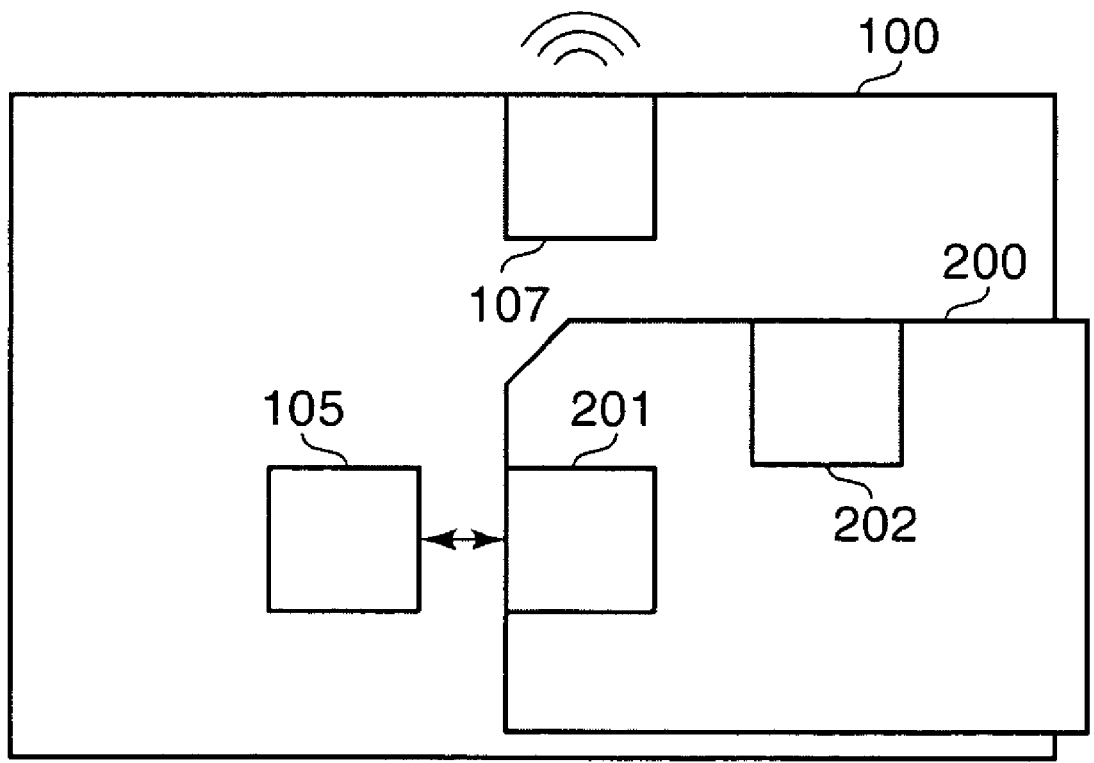

FIG.6C
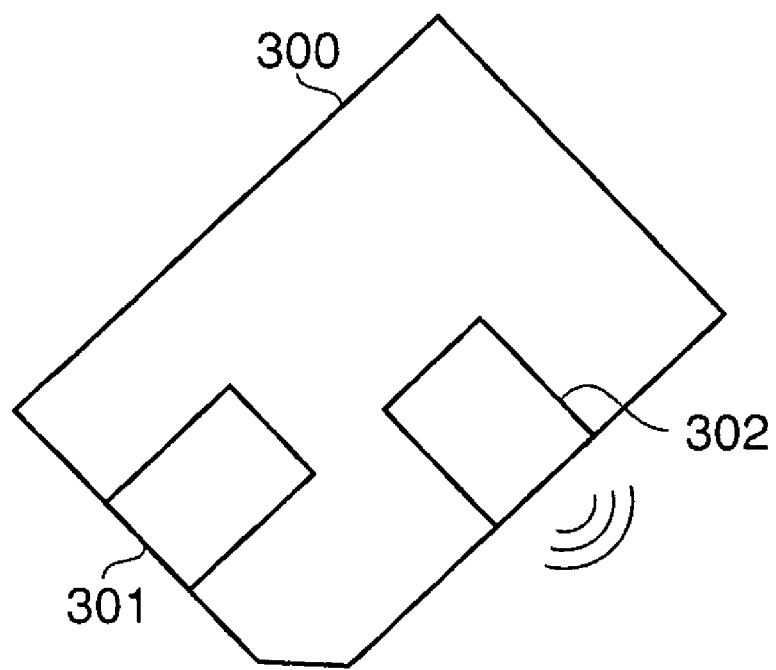
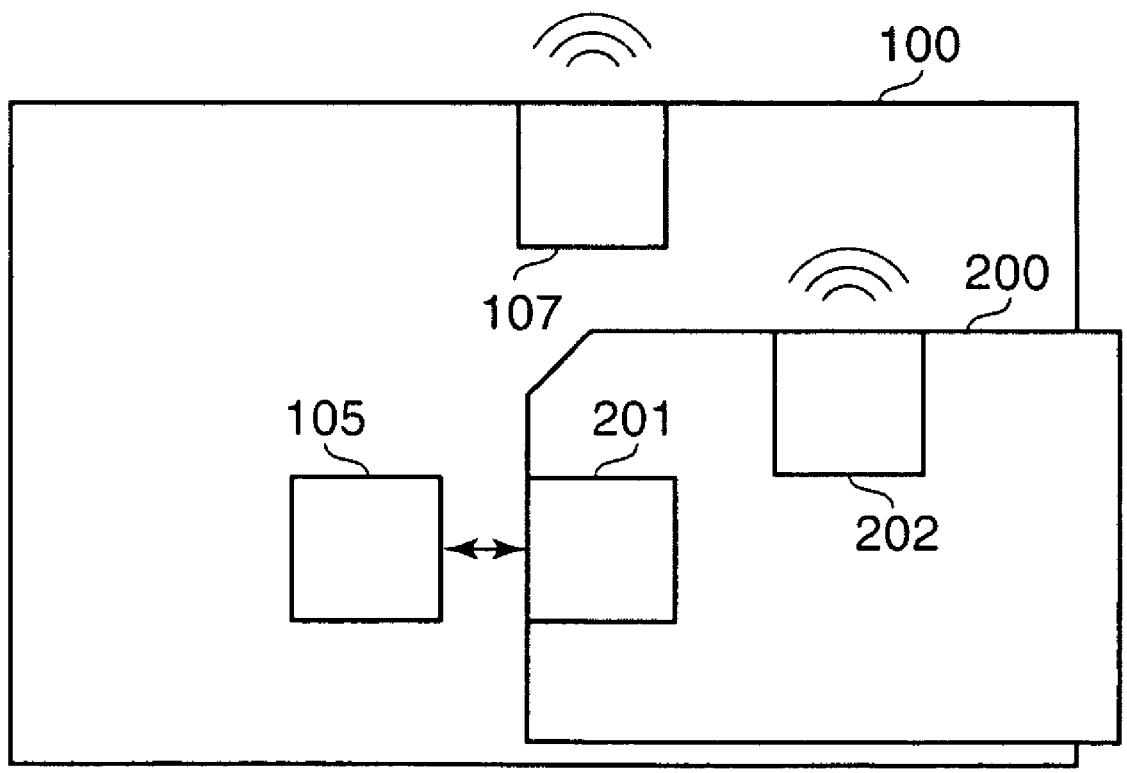

DATA RECORDING APPARATUS AND METHOD FOR CONTROLLING THE SAME, AND DATA RECORDING MEDIUM AND METHOD FOR CONTROLLING THE SAME

BACKGROUND OF THE INVENTION

1. Field of the Invention

The present invention relates to a data recording apparatus that performs communication in a plurality of different communication modes and a method for controlling the same, and a data recording medium that performs communication in a plurality of different communication modes and a method for controlling the same.

2. Description of the Related Art

As a method for performing contactless communication between a data recording apparatus and an IC card, there is known a method for performing communication between a data recording apparatus and an IC card by supplying power from the data recording apparatus to the IC card through electromagnetic induction, and transmits a carrier to the IC card from the data recording apparatus with the carrier modulated. This contactless type IC card has excellent convenience in that the IC card is not in physical contact with the data recording apparatus during the reading and writing of IC card data, unlike a contact type IC card.

However, the contactless type IC card is not suited to applications with large power consumption and has problems, such as being affected by electromagnetic wave noises.

Therefore, a hybrid IC card comprising two types of communication parts, a contactless communication part and a contact communication part, has been considered. Japanese Laid-Open Patent Publication (Kokai) No. 2003-036428 proposes a technique of selecting the optimal communication part among the contactless communication part and the contact communication part according to the environment of use and the application to suitably utilize the characteristics of the communication parts of a hybrid IC card. Also, in recent years, in addition to such hybrid IC cards, cellular phones and digital cameras having a contactless communication part, and the like have also been considered.

FIG. 6A is a view which is useful in explaining a conventional hybrid IC card.

In FIG. 6A, a hybrid IC card 200 has a contact communication part 201 for performing contact communication, and a contactless communication part 202 for performing contactless communication.

Here, the contact communication refers to transmitting and receiving data with apparatuses being in contact with each other. Examples of the contact communication include, for example, communication between a digital camera and the so-called memory card, such as an SD card. A general digital camera has a terminal for communicating with a memory card, and performs communication by the terminal of the memory card being in contact with the terminal of the digital camera.

On the other hand, the contactless communication refers to transmitting and receiving data without apparatuses being in contact with each other (at a relatively short communication distance in various kinds of wireless communication). For example, the communication distance of contactless communication is several cm to ten-odd cm and is shorter than that of short-range wireless communication, such as Bluetooth with a communication distance of about 10 m. Examples of the contactless communication include, for example, communication using an induction electric field caused by apparatuses coming closer to each other, and communication using radio waves.

FIG. 6B is a view showing a case in which the hybrid IC card 200 is mounted in a digital video camera.

In FIG. 6B, it is assumed that a digital video camera (hereinafter simply abbreviated as "the DVC") 100 comprises a contactless communication part 107 for performing contactless communication, and a contact communication part 105 for performing contact communication.

When the hybrid IC card (hereinafter simply abbreviated as "the IC card") 200 is mounted in the DVC 100, communication can be performed between the contact communication part 105 of the DVC 100 and the contact communication part 201 of the IC card 200. In this case, the contactless communication part 107 of the DVC 100 and the contactless communication part 202 of the IC card 200 are likely to be located within a communication range, which enables the DVC 100 and the IC card 200 to also communicate with each other by contactless communication.

Therefore, it is preferable to make it possible to set, when the DVC 100 communicates with the IC card 200, which of contact communication and contactless communication is used.

For example, when the IC card 200 is mounted in the DVC 100, the contactless communication does not need to be performed, thereby making it possible to invalidate communication between the contactless communication part 202 and the contactless communication part 107, which provides, however, the following problems.

As shown in FIG. 6C, with the IC card 200 being mounted in the DVC 100, the contactless communication part 107 of the DVC 100 can perform contactless communication with a hybrid IC card 300 different from the IC card 200 via a contactless communication part 302. However, in such a case, invalidating the contactless communication part 107 of the DVC 100, due to the fact that the IC card 200 being mounted in the DVC 100 is detected, makes it impossible to perform contactless communication between the DVC 100 and the hybrid IC card 300.

On the contrary, always validating the contactless communication part 107 may decrease the quality of communication between the contactless communication part 107 and the contactless communication part 302, due to the interference of radio waves generated by the contactless communication part 202 with the hybrid IC card 300.

SUMMARY OF THE INVENTION

The present invention provides a data recording apparatus that can suitably perform communication with a data recording medium via a plurality of communication parts and a method for controlling the same, and a data recording medium that can suitably perform communication with a data recording apparatus via a communication parts and a method for controlling the same.

According to a first aspect of the invention, there is provided with a data recording apparatus to which a data recording medium having a first communication part and a second communication part can be attached, comprising a third communication part adapted to communicate with the first communication part, and a fourth communication part adapted to communicate with the second communication part, the data recording apparatus comprising: a detection part adapted to detect the data recording medium being attached to the data recording apparatus; and a control part adapted to take control to stop communication of the fourth communication part with the second communication part if the third communication part can communicate with the first communication part in a case where the detection part detects the data recording medium being attached to the data recording apparatus.

According to a second aspect of the invention, there is provided a data recording medium comprising a first communication part and a second communication part, and being able to be attached to a data recording apparatus, wherein the data recording apparatus comprising a third communication part adapted to communicate with the first communication part, and a fourth communication part adapted to communicate with the second communication part, the data recording medium comprising: a detection part adapted to detect the data recording medium being attached to the data recording apparatus; and a control part adapted to take control to stop communication of the second communication part with the fourth communication part if the first communication part can communicate with the third communication part in a case where the detection part detects the data recording medium being attached to the data recording apparatus.

As a third aspect of the invention, there is provided a method for controlling a data recording apparatus to which a data recording medium having a first communication part and a second communication part can be attach, comprising a third communication part adapted to communicate with the first communication part, and a fourth communication part adapted to communicate with the second communication part, the method comprising the steps of: detecting the data recording medium being mounted in the data recording apparatus; and taking control to stop communication of the fourth communication part with the second communication part when the third communication part can communicate with the first communication part in a case where the data recording medium being attached to the data recording apparatus is detected at the detection step.

As a fourth aspect of the invention, there is provided a method of controlling a data recording medium comprising a first communication part and a second communication part, and being able to be attached to a data recording apparatus comprising a third communication part adapted to communicate with the first communication part, and a fourth communication part adapted to communicate with the second communication part, the method comprising the step of: detecting the data recording medium being attached to the data recording apparatus; and taking control to stop communication of the second communication part with the fourth communication part if the first communication part can communicate with the third communication part in a case where the data recording medium being attached to the data recording apparatus is detected at the detection step.

Further features and advantages of the present invention will become apparent from the following detailed description of exemplary embodiments with reference to the attached drawings.

BRIEF DESCRIPTION OF THE DRAWINGS

FIG. 3 is a conceptual view showing a communication state between the data recording apparatus and the data recording medium in FIG. 1.

FIG. 6C is a view showing a case where with the hybrid IC card 200 being mounted in the DVC 100, the contactless communication part 107 of the DVC 100 performs contactless communication with the hybrid IC card 300 different from the hybrid IC card 200 via the contactless communication part 302.

DETAILED DESCRIPTION OF THE PREFERRED EMBODIMENTS

The invention will now be described in detail below with reference to the accompanying drawings showing preferred embodiment thereof.

Figure 1:
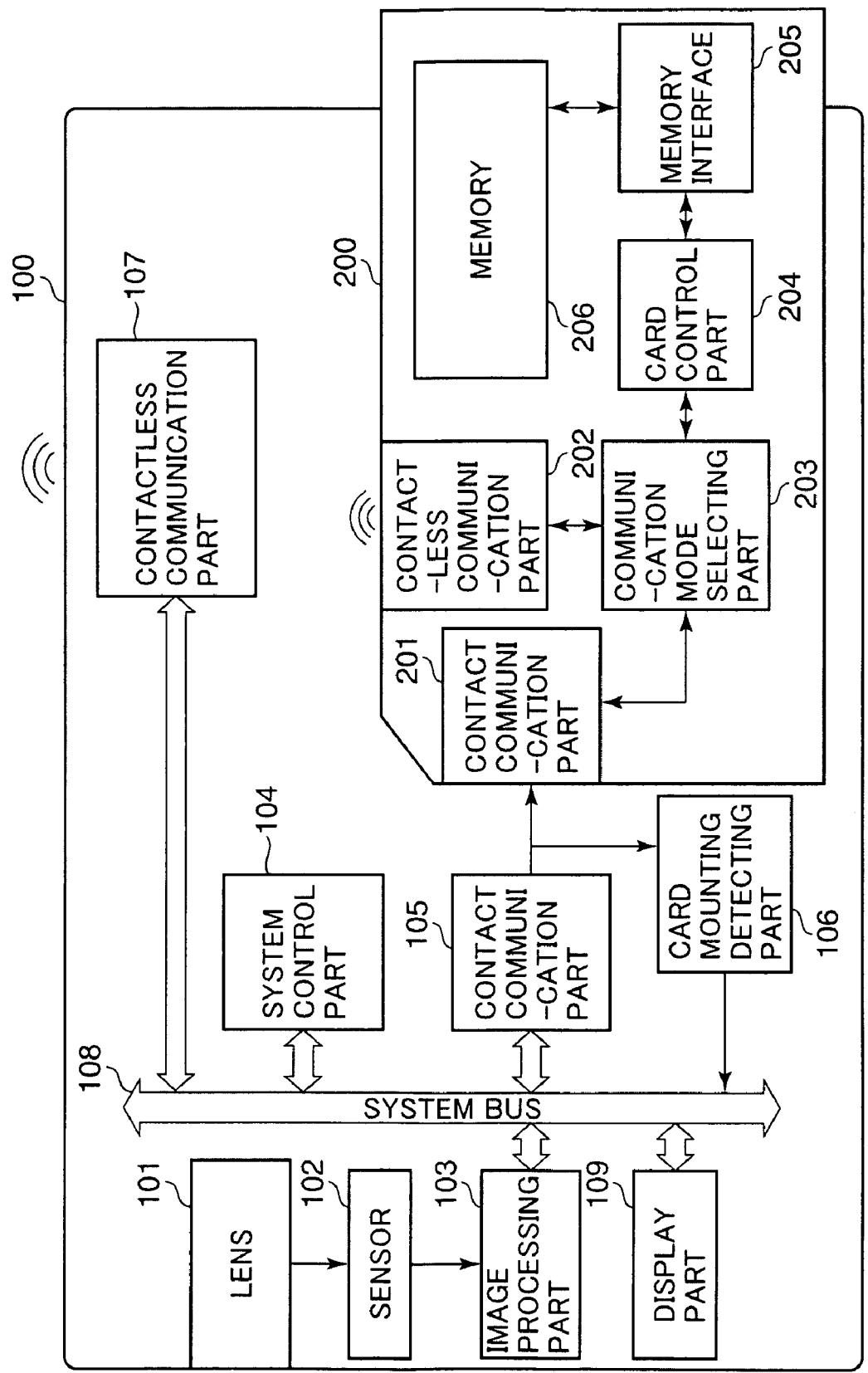
FIG. 1 is a block diagram which is useful in explaining a data recording apparatus according to a first embodiment of the present invention, and a data recording medium that can be attached to or detached from the data recording apparatus.

FIG. 1 is a block diagram which is useful in explaining a data recording apparatus according to a first embodiment of the present invention, and a recording medium that can be attached to or detached from the data recording apparatus.

In this embodiment, the data recording apparatus comprises a digital video camera (hereinafter simply abbreviated as "the DVC") 100, and the recording medium comprises a hybrid IC card (hereinafter simply abbreviated as "the IC card") 200.

In FIG. 1, the DVC 100 and the IC card 200 can transmit or receive data with each other via two types of communication parts, contact communication parts and contactless communication parts.

FIG. 1 shows a state in which the IC card 200 is mounted in the DVC 100. A contact communication part 105 and a contact communication part 201 are in contact with each other so as to communicate with each other. Also, it is assumed that a contactless communication part 107 and a contactless communication part 202 are located within a communication range. The DVC 100 is largely comprised of a control mechanism, a shooting mechanism, and a recording mechanism.

The control mechanism has a system control part 104 which controls the entire system, and this system control part 104 is comprised of a CPU, a ROM, and the like. In FIG. 1, a system bus 108 is used as a path for control signals output from the system control part 104, control signals between respective nodes, and data.

The shooting mechanism is comprised of a lens 101, a sensor 102, an image processing part 103, and the like. An image condensed by the lens 101 is photoelectrically converted by the sensor 102 and coded to digital image data by the image processing part 103.

The recording mechanism is comprised of the contact communication part 105, the contactless communication part 107, and a card mounting detecting part 106, and the like.

The system control part 104 selects which of the contact communication and the contactless communication is used to record the coded digital image data in the IC card 200.

When the system control part 104 selects the contactless communication, the coded digital image data is recorded in the IC card 200 via the system bus 108 and the contactless communication part 107.

When the system control part 104 selects the contact communication, the coded digital image data is recorded in the IC card 200 via the system bus 108 and the contact communication part 105.

The DVC 100 comprises, in addition, a display part 109 used for the user to check reproduced images and the state of the system, and an operation part for performing the operation, and the like.

The IC card 200 comprises the contact communication part 201, the contactless communication part 202, and a communication mode selecting part 203 used for the user to select which of the contact communication and the contactless communication to be used.

Also, the IC card 200 comprises a card control part 204 for controlling the system of the IC card 200, a memory 206 as a storage element, and a memory interface 205 as an interface between the memory 206 and the card control part 204.

Figure 2:
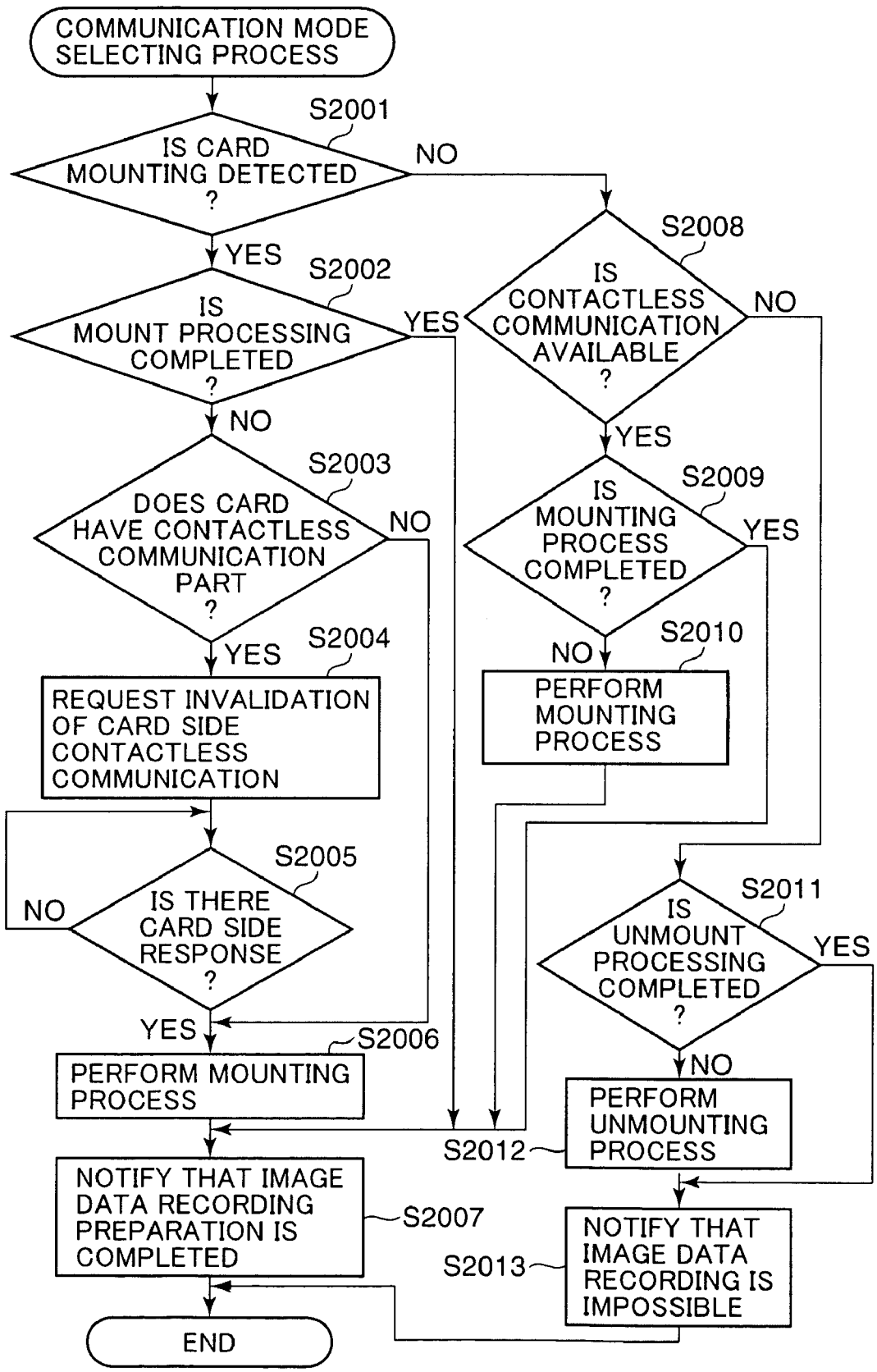
FIG. 2 is a flowchart showing a communication mode selecting process carried out by the data recording apparatus in FIG. 1.

FIG. 2 is a flowchart showing a communication mode selecting process carried out by the data recording apparatus in FIG. 1.

This process is carried out under the control of the system control part 104 of the DVC 100 in FIG. 1.

In FIG. 2, when the card mounting detecting part 106 detects the IC card 200 being mounted (YES in a step S2001), the DVC 100 determines whether or not a mount processing is completed that analyzes the file structure of the IC card 200 to realize a readable and writable state (a step S2002).

When the mount processing is not completed (NO in the step S2002), the DVC 100 obtains data on the IC card 200 from the IC card 200 currently mounted, and decides the type of the IC card 200 to determine whether or not the IC card 200 has the contactless communication part (a step S2003). When the IC card 200 has the contactless communication part, the program proceeds to a step S2004, whereas when the IC card 200 does not have the contactless communication part, the program proceeds to a step S2006. The IC card 200 in FIG. 1 has the contactless communication part 202, so that the program proceeds to the step S2004.

Moreover, an IC card that is determined as not having the contactless communication part in the step S2003 includes not only an IC card having only a contact communication part, but also an IC card having a wireless communication part, e.g. a wireless LAN, other than the contactless communication, because it is considered to be general that an IC card which is larger in a communication range than contactless communication generally communicates with an external apparatus (for example, a personal computer or a server apparatus) other than the DVC.

As a result of the determination in the step S2003, when the mounted IC card 200 has the contactless communication part, the DVC 100 transmits a request for invalidating the contactless communication with the IC card via the respective contact communication parts on a side of the main body (DVC) and a side of the IC card (a step S2004). The IC card terminates, on receiving this request, the contactless communication part 202 on a side of the IC card from operating to invalidate an access from external equipment.

When the DVC 100 receives a response from the IC card that the contactless communication part 202 ceases to function (YES in a step S2005), the DVC 100 carries out the mounting process (the step S2006) and displays in the display part 109 a notice indicating that the image data recording preparation is completed (a step S2007), followed by terminating the program.

According to such a manner, it becomes possible to realize communication between the contact communication part 105 and the contact communication part 201, whereas it becomes impossible to realize communication between the contactless communication part 107 and the contactless communication part 202. Therefore, the DVC 100 can communicate with another apparatus different from the IC card 200, using the contactless communication part 107.

As a result of the determination in the step S2002, when the mounting process is completed, the program proceeds to the step S2007. When the card mounting is not detected in the step S2001, it is determined whether or not the contactless communication is available (a step S2008).

When the contactless communication is available (YES in the step S2008), it is determined whether or not the mounting process is completed (a step S2009). This is for determining whether or not the mounting process is performed in the contactless communication part 202, as is distinct from the step S2002.

As a result of the determination in the step S2009, when the mounting process is not yet completed, the mounting process is performed so that the contactless communication part 107 and the contactless communication part 202 can exchange data therebetween (a step S2010), followed by the program proceeding to the step S2007.

As a result of the determination in the step S2008, when contactless communication is not available, it is determined whether or not an unmounting process is completed that records the unrecorded data in the card and closing the file (a step S2011).

As a result of the determination in the step S2011, when the unmounting processing is not available, the DVC 100 carries out the unmounting process (a step S2012), and displays in the display part 109 a notice indicating the image data recording being impossible (a step S2013), followed by terminating the program.

FIG. 3 is a conceptual view showing a communication state between the data recording apparatus and the data recording medium in FIG. 1.

The DVC 100 has mounted therein the IC card 200, so that the contactless communication part 202 in the IC card 200 ceases to function. The DVC 100 and the IC card 200 perform communication via the contact communication part 201 and the contact communication part 105.

Here, when an IC card 300 is brought near the DVC 100, the DVC 100 can communicate with the IC card 300 (a contactless communication part 302) via the contactless communication part 202.

At this time, the contactless communication part 202 of the IC card 200 ceases to function, which reduces the possibility that the contactless communication between the DVC 100 and the IC card 300 is subjected to radio wave interference from the contactless communication part 202 of the IC card 200 can be lowered.

Figure 4:
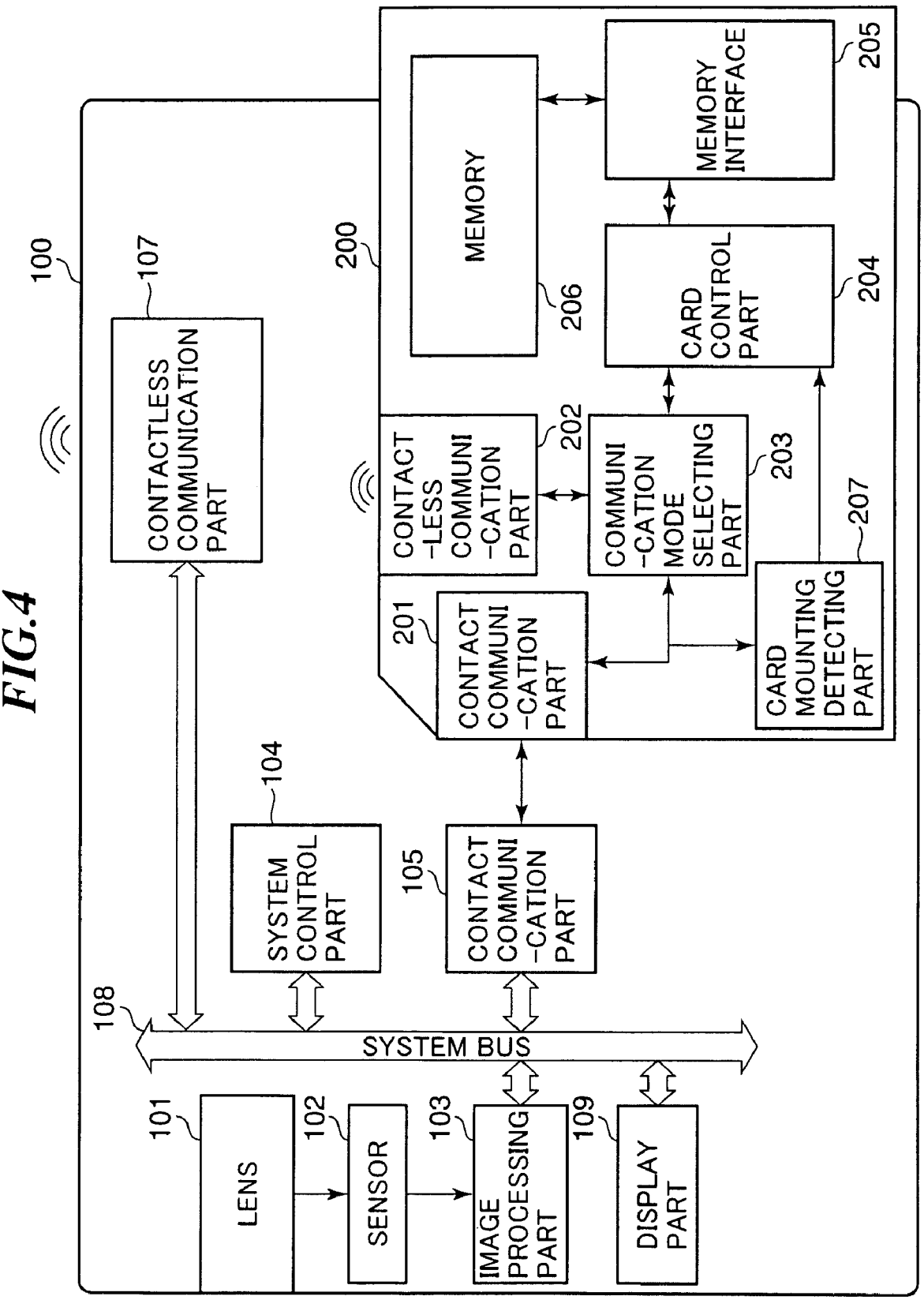
FIG. 4 is a block diagram which is useful in explaining a data recording apparatus according to a second embodiment of the present invention, and a data recording medium that can be attached to or detached from the data recording apparatus.

FIG. 4 is a block diagram which is useful in explaining a data recording apparatus according to a second embodiment of the present invention, and a data recording medium that can be attached to or detached from the data recording apparatus.

The data recording apparatus and the data recording medium in this embodiment are basically the same as the DVC 100 and the IC card 200 in FIG. 1, respectively.

In the first embodiment of the present invention, the card mounting detecting part 106 is provided on a side of the DVC 100, whereas in this embodiment, a card mounting detecting part 207 is provided on a side of the IC card 200.

Figure 5:
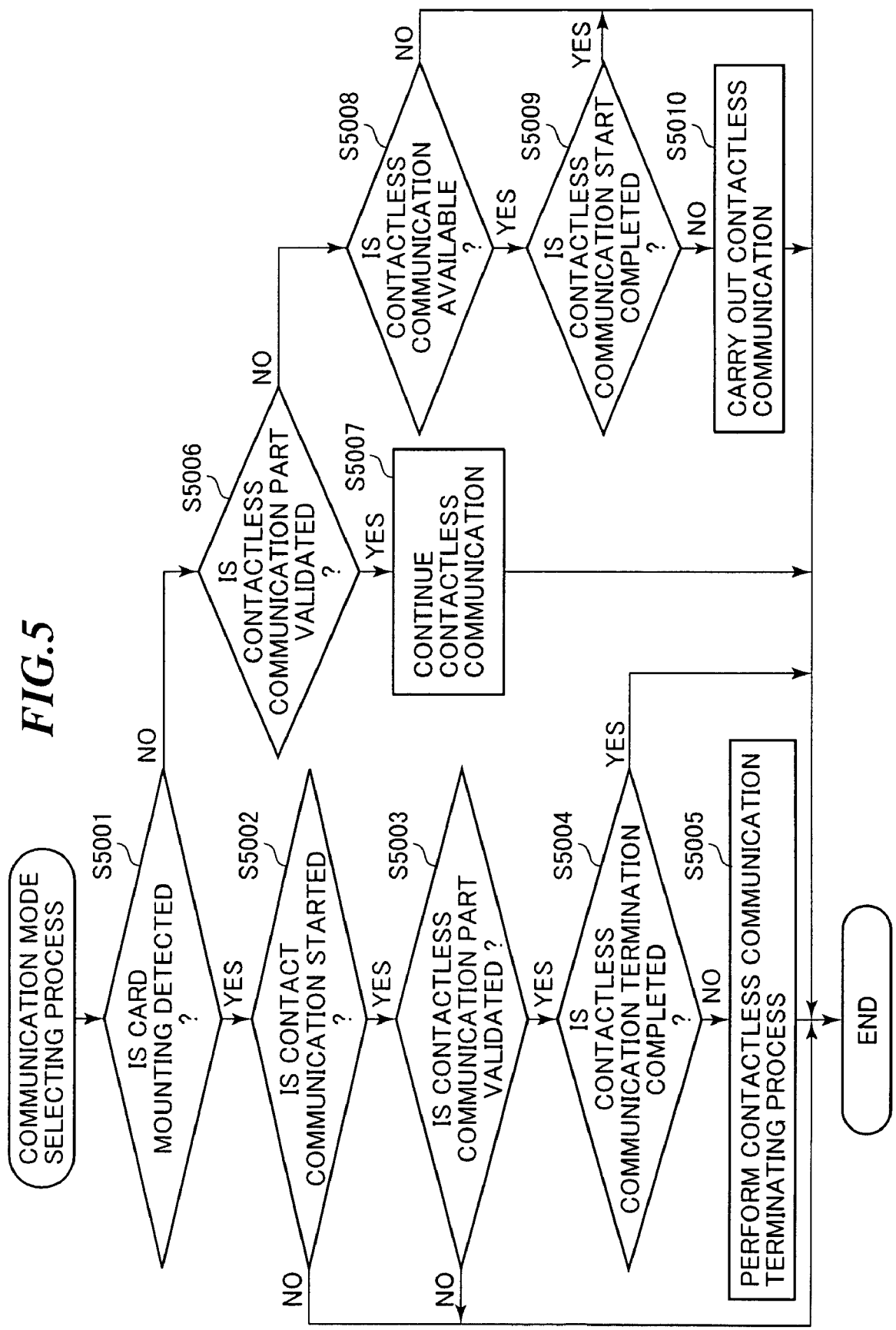
FIG. 5 is a flowchart showing a communication mode selecting process carried out by the data recording medium in FIG. 4.
Figure 6A:
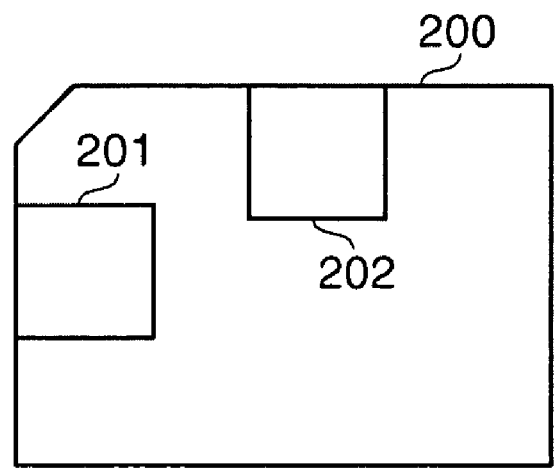
FIG. 6A is a view useful in explaining a conventional hybrid IC card.
Figure 6B:
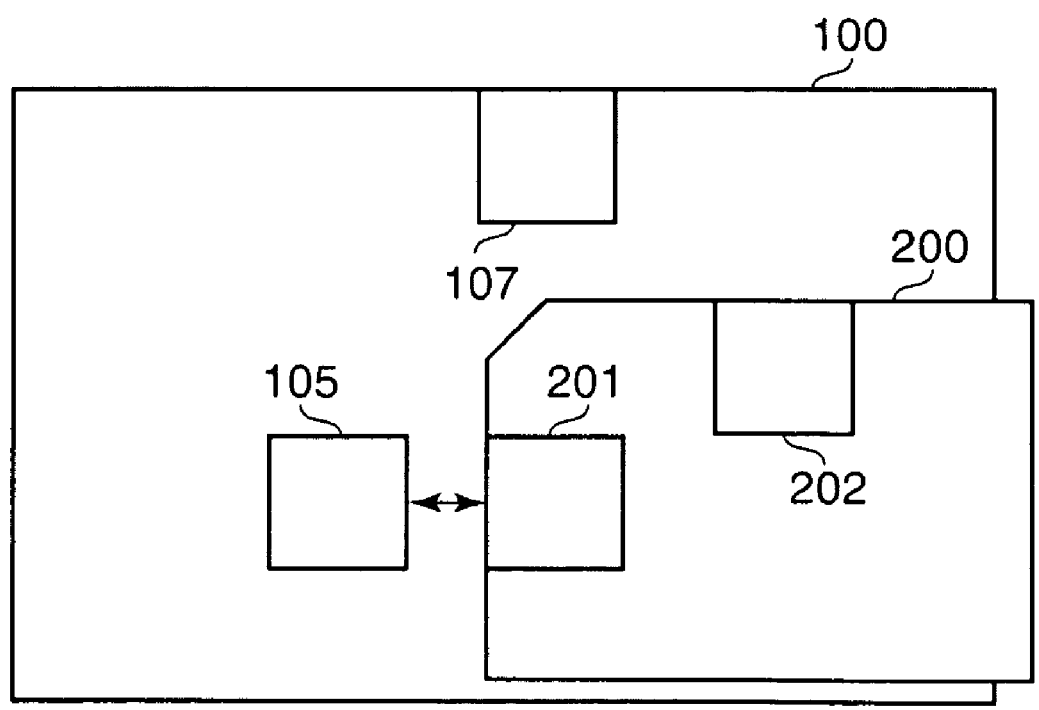
FIG. 6B is a view showing a case where the hybrid IC card 200 is mounted in a digital video camera.

FIG. 5 is a flowchart showing a communication mode selecting process carried out by the data recording medium in FIG. 4.

The processing is carried out under the control of the card control part 204 of the IC card 200 in FIG. 4.

In FIG. 5, the IC card 200 determines whether or not the IC card 200 being mounted in the DVC 100 is detected by the card mounting detecting part 207 (a step S5001). When the IC card 200 being mounted in the DVC 100 is detected, it is determined whether or not the contact communication is started (a step S5002). When the contact communication is not started, the program is terminated.

As a result of the determination in the step S5002, when communication by the contact communication part 202 is started, it is determined whether or not the contactless communication part 202 is validated to be operable (a step S5003). When the communication by the contactless communication part 202 is validated, the IC card 200 terminates the contactless communication part 202 from operating, to stop communication with external equipment (steps S5004 and S5005), followed by terminating the program.

As a result of the determination in the step S5001, when the card mounting is not detected, a process for starting communication by the contactless communication part 202 is started.

In other words, it is determined whether or not the contactless communication part 202 is validated to be operable (a step S5006). When the communication by the contactless communication part 202 is validated, the IC card 202 continues the contactless communication (a step S5007).

As a result of the determination in the step S5006, when the communication by the contactless communication part is not validated, it is determined whether or not the contactless communication is available (a step S5008). When the contactless communication is available, the communication of the contactless communication part 202 is started (steps S5009 and S5010), followed by terminating the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2008-150811, filed Jun. 9, 2008, which is hereby incorporated by reference herein in its entirety.

What is claimed is:

1. A data recording apparatus to which a data recording medium having a first communication part and a second communication part connectable to the data recording apparatus, the data recording apparatus comprising:
   a third communication part adapted to communicate with the first communication part;
   a fourth communication part adapted to communicate with the second communication part
   a detection part adapted to detect whether the data recording medium is connected to the data recording apparatus; and
   a control part adapted to control the third communication part to transmit to the first communication part a request for stopping communication with the second communication part if the third communication part is communicable with the first communication part in a case where the detection part detects that the data recording medium is connected to the data recording apparatus.

2. A data recording apparatus according to claim 1, wherein the third communication part performs contact communication via a transmission line, and the fourth communication part performs contactless communication via radio waves.

3. A data recording apparatus according to claim 1, wherein the fourth communication part performs communication with another device which is not attached to the data recording apparatus.

4. A method of controlling a data recording apparatus to which a data recording medium having a first communication part and a second communication part is connectable to the data recording apparatus, which has a third communication part adapted to communicate with the first communication part, and a fourth communication part adapted to communicate with the second communication part, the method comprising the steps of:
   detecting whether the data recording medium is connected to the data recording apparatus; and
   controlling third communication part to transmit to the first communication part a request for stopping communication with the second communication part if the third communication part is communicable with the first communication part in a case where the detection step detects that the data recording medium is connected to the data recording apparatus.

* * * * *